Sept. 18, 1962

E. C. PROCTER 3,054,299

TIGHTENER

Filed Aug. 17, 1960

INVENTOR
EDWARD C. PROCTER

Joseph Allen Brown
ATTORNEY

Sept. 18, 1962  E. C. PROCTER  3,054,299
TIGHTENER
Filed Aug. 17, 1960  2 Sheets-Sheet 2
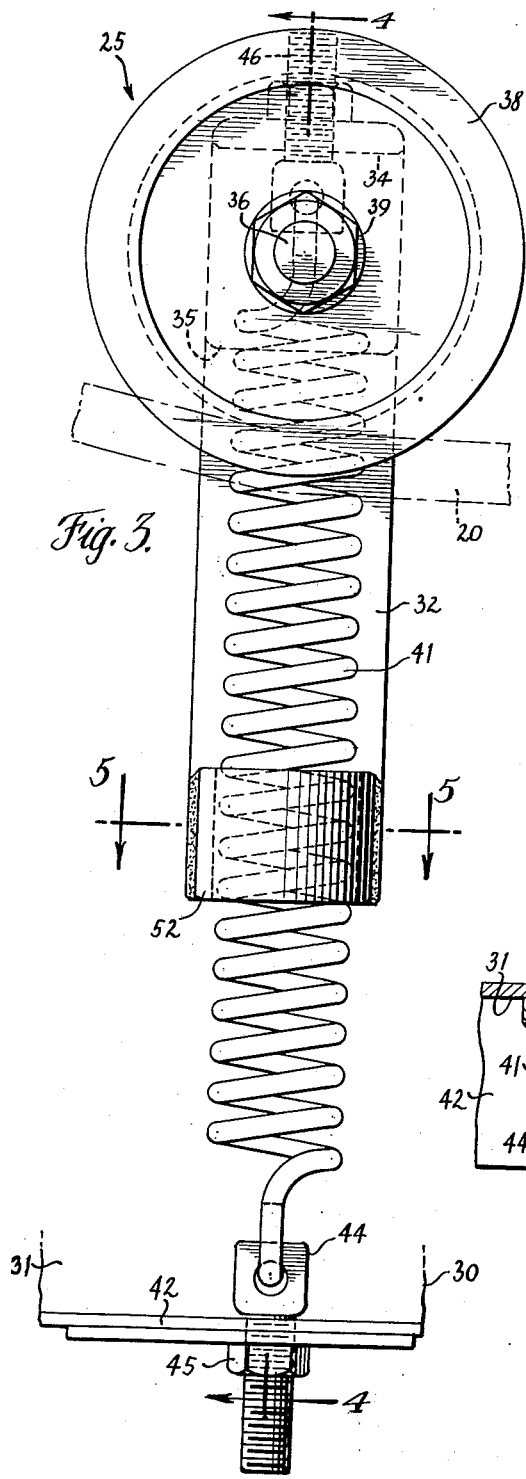
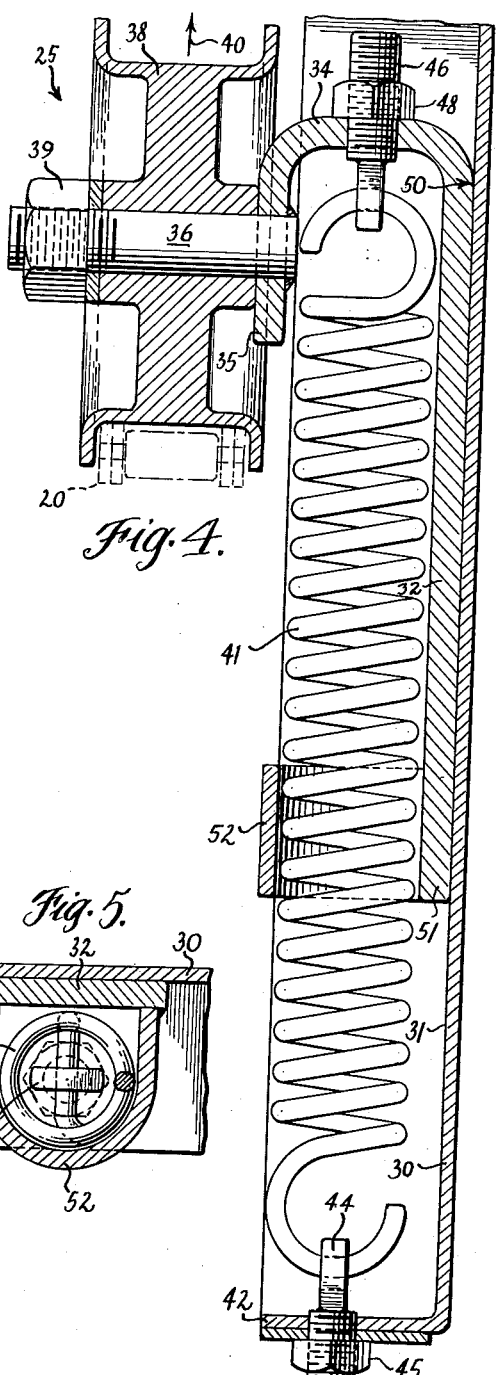
INVENTOR
EDWARD C. PROCTER
ATTORNEY

3,054,299
TIGHTENER
Edward C. Procter, New Holland, Pa., assignor to Sperry Rand Corporation, New Holland, Pa., a corporation of Delaware
Filed Aug. 17, 1960, Ser. No. 50,212
4 Claims. (Cl. 74—242.11)

This invention relates generally to tension devices or tighteners for endless chains, belts or the like, and more particularly to a non-tilt, shiftable idler for limited spaces.

Forage harvesters are commonly provided with power-driven feed rollers, one roller at least being adapted to "float" responsive to the amount of incoming crop material. Generally, such rolls are driven by endless chains and when a given roll floats from its normal position the chain driving it is slackened. To take up such slack, a tightener is provided which is spring biased so that a proper tension will be maintained on the chain regardless of the position of the roll which it drives.

To provide a suitable idler for such a purpose involves few problems where adequate space is available. However, in farm equipment and in other machines, it frequently happens that the available room for the tightener is very limited. Usually, the endless chain itself is a factor and requires that the means which mounts the idler wheel or the tightener be offset relative to the plane of the chain and at the same time be shiftable to accommodate roll movements. The fact that the idler wheel is offset relative to its support and is shiftable, creates tilting problems which are undesirable.

One object of this invention is to provide a shiftable idler for limited spaces and supported so that tilting of the idler about its rotational axis is restricted.

Another object of this invention is to provide a shiftable idler for limited spaces wherein biasing means associated with the idler is utilized to provide means for resisting tilting of the idler.

Another object of this invention is to provide an idler wheel which is mounted so that it may shift relative to a surface which supports it but is restrained from tilting regardless of its shifted position.

A further object of this invention is to provide an idler wheel which is rotatable in the plane of an endless member which it engages and is supported by means offset from such plane, such support means including means which restrains the idler from tilting about its rotational axis.

A still further object of this invention is to provide a shiftable idler of the character described which is of simple, low-cost design, easy to assemble and repair.

Other objects of this invention will be apparent hereinafter from the specification and from the recital in the appended claims.

In the drawings:

FIG. 3 is a side elevation of the idler wheel on a greatly enlarged scale and showing the details of the mounting structure therefor;

FIG. 4 is a longitudinal section taken on line 4—4 of FIG. 3 looking in the direction of the arrows; and FIG. 5 is a transverse section taken on the line 5—5 of FIG. 3 looking in the direction of the arrows.

Figure 1:
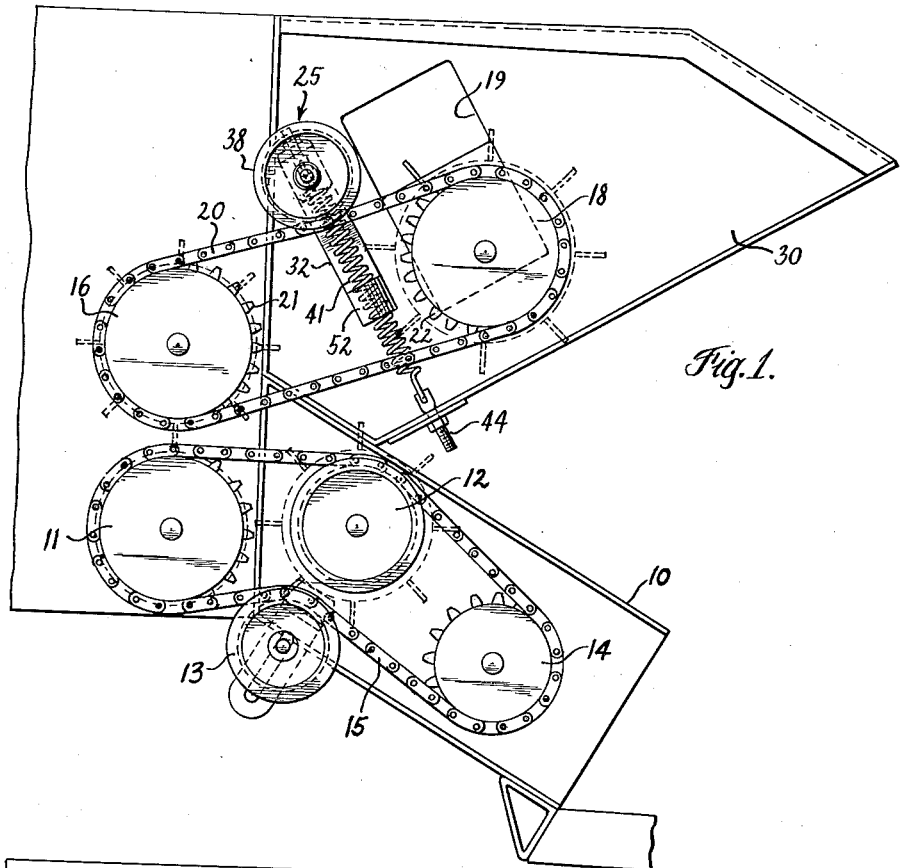
FIG. 1 is a side elevation of a section of a forage harvester having feed rolls driven by an endless chain and being provided with a non-tilt shiftable idler constructed according to this invention.
Figure 2:
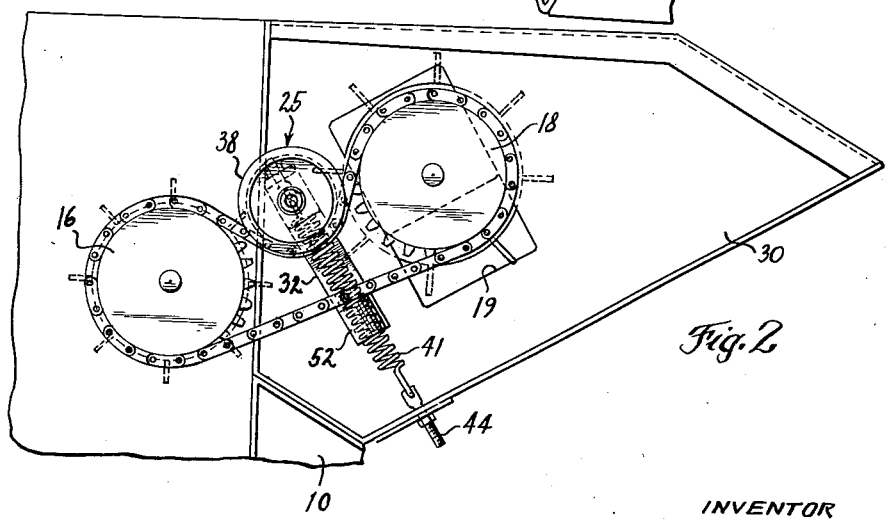
FIG. 2 is a fragmentary view similar to FIG. 1 and showing the idler shifted to another position.

Referring now to the drawings by numerals of reference, and first to FIGS. 1 and 2, 10 denotes a framework of the type found in a forage harvester. Rotatably mounted on such framework are lower feed rolls 11 and 12 and drive sprocket 14. Extending around sprockets for these rolls and sprocket 14 is an endless chain 15 held under desired tension by an adjustable idler 13. Mounted above rolls 11 and 12 and cooperative therewith are two infeed rolls 16 and 18 rotatably mounted on the framework 10. Roll 16 is rotatable about a fixed axis. However, the roll 18 is mounted to float up and down responsive to the volume of material entering the harvester. An opening 19 is provided in frame 10 to accommodate for such shifting of the roll 18. The rolls 16 and 18 are interconnected by an endless chain 20 which extends around sprockets 21 and 22 for the respective rolls.

When the roll 18 floats upwardly from the position shown in FIG. 1 toward the position shown in FIG. 2, the endless chain 20 becomes slack. To take up such slack and to maintain a desired tension on the chain 20, a nontilt shiftable idler wheel 25 is provided. Such idler wheel is constructed and supported as shown best in FIGS. 3–5.

The framework 10 includes a side support plate 30 having a flat supporting surface 31. Abutting against surface 31 and slidable thereon is a rigid metal strap 32 which has an offset portion 34 at one end including a portion 35 which extends parallel to the extension of the strap. Welded to portion 35 and extending perpendicular to the flat surface 31 is a pin 36 on which idler wheel 38 is rotatably mounted. The idler wheel is held in place on pin 36 by a nut 39 threaded on to the outer end of the pin.

Endless chain 20 engages idler wheel 38 and biases it in a direction indicated by the arrow 40 in FIG. 4. Therefore, there is a tendency for the strap 32 to move upwardly relative to FIGS. 3 and 4. Such movement is resisted by a coiled spring 41 located in a plane between strap 32 and the plane in which chain 20 and idler wheel 38 operate. Spring 41 extends from the offset portion 34 to a flange 42 on the support plate 30. One end of the coil spring 41 is connected to flange 42 by an eye member 44 threaded through flange 42 and adjustable relative thereto. A nut 45 is provided to lock eye member 44 in adjusted position. The opposite end of the coil spring is connected to the offset portion 34 by a similar threaded eye member 46 adjustable relative to the offset portion 34 of the strap 32 and adapted to be locked in place by the nut 48. Therefore, the tension on the spring 41 can be adjusted at either end.

The structure employed is such that the endless chain 20 pushing on the idler wheel 38 in the direction indicated by arrow 40, extends or tensions coil spring 41. Therefore, the idler wheel is continuously biased in a direction opposite to arrow 40. Since the idler wheel is offset relative to supporting plate 32 and spring 41, there is a tendency for the wheel to tilt about the point 50 (FIG. 4) and move the end 51 of strap 32 away from the support plate 30. Such outward movement or tilting of the idler and strap is prevented by a U-shaped holder 52 which surrounds spring 41 and is welded or otherwise affixed to the end 51 of strap 32. The holder 52 and that portion of the strap 32 adjacent to it are engageable with the periphery of the spring 41 if there is any tilting of the strap member 32. Since the spring 41 is under tension, its periphery serves to resist any tilting of the strap 32 and thereby restrains the idler wheel to rotate about an axis substantially perpendicular to the flat face 31 of the support 30.

When the chain 20 becomes slack, as shown in FIG. 2, the idler wheel 38 moves with it to retain the chain in tightened condition. The wheel is moved by the action of the spring 41 and energy stored therein while it is held tensioned.

With this structure, the mounting means for the idler wheel 38 is displaced relative to the plane of the chain 20.

Nevertheless, the idler wheel is free to move with the chain and in constant tightening engagement therewith. Likewise, the eye members 44 and 46 provide pivotal connections between strap 32 and support frame 30 with spring 41 whereby the idler wheel is free to pivot in a plane parallel to the surface 31 to thereby follow the chain 20. Further, members 44 and 46 may be used for properly locating spring 41.

The structure described provides a non-tilt shiftable idler for limited spaces and eliminates the problem of wear and tear which would result if the idler wheel tilted relative to its support. Applicant has simply and easily used the periphery of the tension spring 41 to provide the desired resistance force to tilting.

While this invention has been described in connection with a particular embodiment thereof, it will be understood that it is capable of further modification and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A non-tilt, shiftable idler for limited spaces comprising a fixed support, an idler wheel rotatable in a given plane spaced from said support and about an axis generally perpendicular to the support, a rigid strap between said support and said idler wheel, said strap abutting against said support and being slidable thereon, one end of said strap having an offset portion projecting from said support and on which said idler wheel is rotatably mounted, a coil spring extending parallel to said strap and in a plane between said support and said given plane, means connecting one end of said spring to said offset portion of said strap, means pivotally connecting the opposite end of said spring to said support, an endless member engaging said idler wheel and urging it in a direction away from said opposite end of said spring and against the resistance of the spring whereby the spring is tensioned, and a holder surrounding a portion of said spring adjacent the end of said strap opposite said one end and offset portion, said holder and opposite end of said strap being engageable with the periphery of said spring to resist tilting of said idler wheel.

2. A non-tilt, shiftable idler for limited spaces as recited in claim 1 wherein the means for connecting said spring to said strap and the means for connecting the spring to said support are both adjustable whereby the tension and the location of said spring relative to said support can be varied.

3. A non-tilt, shiftable idler for limited spaces comprising a fixed support, an idler wheel spaced from said support and rotatable about an axis generally perpendicular to the support, a strap between said support and said idler wheel, said strap abutting against said support and being slidable thereon, one end of said strap having an offset portion projecting from said support and on which said idler wheel is rotatably mounted, a coil spring extending along said strap and having one end connected to said offset portion of the strap and opposite end connected to said support, an endless member engaging said idler wheel and urging it away from said opposite end of said spring and against the resistance of the spring whereby the spring is tensioned, and a holder affixed to the opposite end of said strap and engageable with the periphery of said spring to resist tilting of said idler wheel relative to said support.

4. A non-tilt, shiftable idler for limited spaces comprising a support having a flat surface, an elongate strap having a major portion of its length slidable on said surface, an idler wheel mounted on said strap only and rotatable in a given plane spaced from said surface and about an axis generally perpendicular to the surface, a coil spring extending alongside said strap and connecting the strap to said support and having an axis located in a plane between the strap portion and said given plane, an endless member engaging said idler wheel and tending to move the wheel relative to said support and against the resistance of said spring whereby the spring is tensioned, and means engageable with a portion at least of the periphery of said tensioned spring and connected to said strap for resisting tilting of said idler wheel relative to said flat surface of said support.

References Cited in the file of this patent

UNITED STATES PATENTS

| | | |
|---|---|---|
| 1,374,643 | Fischbach | Apr. 12, 1921 |
| 2,341,273 | Helberg | Feb. 8, 1944 |
| 2,856,786 | Van Duyn | Oct. 21, 1958 |

FOREIGN PATENTS

| | | |
|---|---|---|
| 58,611 | Denmark | Apr. 7, 1941 |